US009633449B2

(12) United States Patent
Wang et al.

(10) Patent No.: US 9,633,449 B2
(45) Date of Patent: Apr. 25, 2017

(54) APPARATUS AND METHOD FOR DETECTING COLOR CHECKER IN IMAGE (71) Applicant: FUJITSU LIMITED, Kawasaki-shi, Kanagawa (JP)

(72) Inventors: Song Wang, Beijing (CN); Akihiro Minagawa, Kawasaki (JP); Wei Fan, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 56 days.

(21) Appl. No.: 14/699,532

(22) Filed: Apr. 29, 2015

(65) Prior Publication Data
US 2015/0317804 A1 Nov. 5, 2015

(30) Foreign Application Priority Data

Apr. 30, 2014 (CN) .......................... 2014 1 0183248

(51) Int. Cl.
G06K 9/00 (2006.01)
G06T 7/40 (2017.01)
(Continued)

(52) U.S. Cl.
CPC ............ *G06T 7/408* (2013.01); *G06K 9/4604* (2013.01); *G06K 9/4652* (2013.01);
(Continued)

(58) Field of Classification Search
CPC ....... G06T 7/408; G06T 5/007; G06T 7/0042; G06T 7/0095; G06T 7/0081;
(Continued)

(56) References Cited

U.S. PATENT DOCUMENTS

2012/0076405 A1* 3/2012 Brunner ............ G06K 9/00456 382/167
2013/0336583 A1 12/2013 Ernst et al.
2015/0009226 A1 1/2015 Minagawa et al.

FOREIGN PATENT DOCUMENTS

CN 101136192 3/2008
CN 102149000 8/2011
(Continued)

OTHER PUBLICATIONS

Minagawa, Akihiro, et al. "A color chart detection method for automatic color correction." Pattern Recognition (ICPR), 2012 21st International Conference on. IEEE, 2012.*
(Continued)

*Primary Examiner* — Andrew Moyer
(74) *Attorney, Agent, or Firm* — Staas & Halsey LLP (57) ABSTRACT Embodiments provide an apparatus and method for detecting a color checker in an image including: an extracting unit to extract sliding window features of sliding windows at multiple positions from an input image by using a predefined sliding window; a selecting unit to select, by using multiple predefined sliding window templates, a sliding window having a minimum distance from each sliding window template from the sliding windows at the multiple positions as a matched sliding window of the sliding window template; and a determining unit to determine segmentation lines of colored squares of a color checker in the input image according to a matching result of each sliding window template.

11 Claims, 6 Drawing Sheets (51) Int. Cl.
*G06T 5/00* (2006.01)
*G06K 9/46* (2006.01)
*G06T 7/73* (2017.01)
*G06T 7/11* (2017.01)
*G06T 7/168* (2017.01)
*G06T 7/90* (2017.01)

(52) U.S. Cl.
CPC ............ *G06K 9/4671* (2013.01); *G06T 5/007* (2013.01); *G06T 7/11* (2017.01); *G06T 7/168* (2017.01); *G06T 7/73* (2017.01); *G06T 7/90* (2017.01); *G06K 2009/4657* (2013.01); *G06T 2200/12* (2013.01); *G06T 2207/10004* (2013.01); *G06T 2207/10024* (2013.01); *G06T 2207/20048* (2013.01); *G06T 2207/30168* (2013.01)

(58) Field of Classification Search
CPC ....... G06T 2200/12; G06T 2207/10004; G06T 2207/10024; G06T 2207/20048; G06K 9/4652; G06K 9/4671; G06K 9/4604; G06K 2009/4657
USPC .................................................. 382/164, 165
See application file for complete search history.

(56) References Cited

FOREIGN PATENT DOCUMENTS

CN           103503025         1/2014
WO       2013/145295 A1    10/2013

OTHER PUBLICATIONS

Extended European Search Report dated Nov. 9, 2015 in corresponding European Patent Application No. 15164339.2.
Viola et al., "Rapid Object Detection using a Boosted Cascade of Simple Features", IEEE, 2001, pp. 511-518.
"Analyze Images of the X-Rite Colorchecker" http://www.imatest.com/docs/colorcheck/ Apr. 21, 2014.
C. Grana, et al. "Practical Color Calibration for Dermoscopy, Applied to a Digital Epiluminescense Microscope", Skin Research and Technology, 2005; 11, 242-247.
Simone Bianco, et al., "Color Target Localization Under Varying Illumination Conditions", CCIW 2011, pp. 245-255.
Akihiro Minagawa, et al., "A Color Chart Detection Method for Automatic Color Correction", ICPR 2012, pp. 1912-1915.

\* cited by examiner

APPARATUS AND METHOD FOR DETECTING COLOR CHECKER IN IMAGE

CROSS REFERENCE TO RELATED APPLICATIONS

This application claims the benefit of Chinese Application No. 201410183248.6, filed Apr. 30, 2014, the disclosure of which is incorporated herein by reference.

BACKGROUND

1. Field

The present invention relates to the field of image processing, and in particular to an apparatus and a method for detecting a color checker in an image.

2. Description of the Related Art

Figure 1:
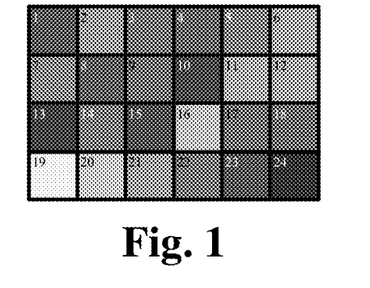
FIG. 1 is a schematic diagram of a palette.

Recently, a color checker introduced by X-rite Company becomes more and more popular, which may be used for correcting a color of a photo captured by a camera. As shown in FIG. 1, the color checker includes 24 colored squares of standard colors. In capturing, a color checker may be placed together with a scenario or an object to be captured. And color correction may be performed on the photo according to colors of the color checker in the photo after capturing. However, as a location, a size and rotation of the color checker in the photo are random, a position area of the color checker must be marked manually, and then the color correction is performed.

In order to achieve an automatic color correction function, some researchers propose methods for automatically detecting a color checker in a photo.

In a method in document 1, a modified SIFT (scale invariant feature transform) feature is used for detection of a color checker. However, as dimensions of its feature vector reach 384, the method is made time consuming. Furthermore, a rough position of the color checker is only given in this method, but positions of each colored square are not given.

Document 2 proposed a detection method based on a hue H (HSV (hue saturation value) color space), in which structures of pyramid levels of images are used to speed up operations. However, in using such a method, when there is relatively large deviation, such as improper white balance setting in capturing, this method may be failed.

Document 1: S. Bianco, C. Cusano. Color Target Localization under Varying Illumination Conditions. Proc. Computational Color Imaging Workshop (CCIW'11), 2011; and Document 2: A. Minagawa, Y. Katsuyama, H. Takebe, Y. Hotta, A color chart detection method for automatic color correction. Proc. International Conference on Pattern Recognition (ICPR), 2012.

It should be noted that the above description of the background art is merely provided for clear and complete explanation of the present application and for easy understanding by those skilled in the art. And it should not be understood that the above technical solution is known to those skilled in the art as it is described in the background of the present application.

SUMMARY

In order to solve the problem pointed out in the Background, embodiments of the present application provide an apparatus and a method for detecting a color checker in an image, so as to improve a speed of detection and robustness.

According to a first aspect of the embodiments of the present application, there is provided an apparatus for detecting a color checker in an image, including:

an extracting unit configured to extract sliding window features of sliding windows at multiple positions from an input image by using a predefined sliding window;

a selecting unit configured to, by using multiple predefined sliding window templates, select a sliding window having a minimum distance from each sliding window template from the sliding windows at the multiple positions and take it as a matched sliding window of the sliding window template; and a determining unit configured to determine segmentation lines of colored squares of a color checker in the input image according to a matching result of each sliding window template.

According to a second aspect of the embodiments of the present application, there is provided a method for detecting a color checker in an image, including:

extracting sliding window features of sliding windows at multiple positions from an input image by using a predefined sliding window;

selecting, by using multiple predefined sliding window templates, a sliding window having a minimum distance from each sliding window template from the sliding windows at the multiple positions and taking it as a matched sliding window of the sliding window template; and determining segmentation lines of colored squares of the color checker according to a matching result of each sliding window template.

According to a third aspect of the embodiments of the present application, there is provided electronic equipment, including the apparatus for detecting a color checker in an image as described in the above first aspect.

According to another aspect of the embodiments of the present application, there is provided a computer-readable program, wherein when the program is executed in an apparatus for detecting a color checker in an image or electronic equipment, the program enables a computer to carry out the method for detecting a color checker in an image as described in the above second aspect in the apparatus for detecting a color checker in an image or the electronic equipment.

According to still another aspect of the embodiments of the present application, there is provided a storage medium in which a computer-readable program is stored, wherein the computer-readable program enables a computer to carry out the method for detecting a color checker in an image as described in the above second aspect in an apparatus for detecting a color checker in an image or electronic equipment.

An advantage of the embodiments of the present application exists in that with the method and apparatus of the embodiments of the present application, the color checker in the image may be automatically detected based on features of independent RGB channels and a geometric structure of the color checker, which improves a speed of detection and robustness.

With reference to the following description and drawings, the particular embodiments of the present application are disclosed in detail, and the principle of the present application and the manners of use are indicated. It should be understood that the scope of the embodiments of the present application is not limited thereto. The embodiments of the present application contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present application, which constitute a part of the specification and illustrate the preferred embodiments of the present application. It is obvious that the accompanying drawings described below are some embodiments of the present application only, and other accompanying drawings may be obtained by those skilled in the art according to these accompanying drawings without making an inventive effort. In the drawings.

DETAILED DESCRIPTION

These and further aspects and features of the present application will be apparent with reference to the following description and attached drawings. In the description and drawings, particular embodiments of the application have been disclosed in detail as being indicative of some of the ways in which the principles of the application may be employed, but it is understood that the application is not limited correspondingly in scope. Rather, the application includes all changes, modifications and equivalents coming within the terms of the appended claims.

Embodiment 1

Figure 2:
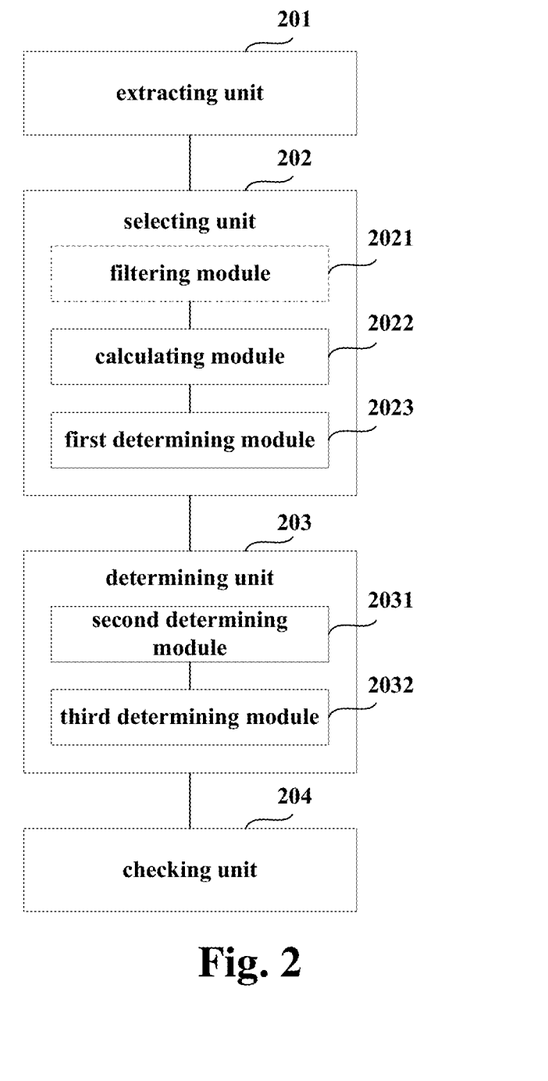
FIG. 2 is a block diagram of the apparatus for detecting a color checker in an image of an embodiment of the present application.

An embodiment of the present application provides an apparatus for detecting a color checker in an image. FIG. 2 is a block diagram of the apparatus. Referring to FIG. 2, the apparatus includes: an extracting unit 201, a selecting unit 202 and a determining unit 203; wherein, the extracting unit 201 is configured to extract sliding window features of sliding windows at multiple positions from an input image by using a predefined sliding window;

the selecting unit 202 is configured to, by using multiple predefined sliding window templates, select a sliding window having a minimum distance from each sliding window template from the sliding windows at the multiple positions and take it as a matched sliding window of the sliding window template;

and the determining unit 203 is configured to determine segmentation lines of colored squares of a color checker in the input image according to a matching result of each sliding window template.

In this embodiment, the extracting unit 201 extracts the features from the input image by using the predefined sliding window. For example, it may scan the whole input image point by point by using the predefined sliding window, extract a feature at each position passed by the predefined sliding window and take it as a sliding window feature of the sliding window of the predefined sliding window at this position.

In this embodiment, the features extracted by the extracting unit 201 are features corresponding to predefined positions of the predefined sliding window in the input image; wherein, the predefined sliding window may be a rectangular sliding window, and may also be sliding windows of other geometric structures, such as a polygonal shape, and a circular shape, etc. Corresponding to the geometric structure of the predefined sliding window, the predefined positions of the predefined sliding window may be the vertices of the predefined sliding window (corresponding to a rectangular sliding window, or a polygon sliding window, etc.), may be the equally-divided points of the predefined sliding window (corresponding to a circular sliding window, etc.), and may be other predefined positions, such as a central point of a sliding window, etc. Of course, the predefined positions are examples only, and according to an actual situation, features to which different predefined positions correspond may be extracted at the same time and taken as the above slide window features. For example, both a feature to which a first predefined position (such as a vertex) corresponds and a feature to which a second predefined position (such as a central point) corresponds may be extracted. Hence, as there may be multiple predefined positions, for example, a polygon has multiple vertices, the extracting unit 201 may extract multiple values corresponding to each position to which the predefined sliding window slides.

In this embodiment, the sliding window feature of the sliding window of the predefined sliding window at each position includes: a feature vector corresponding to an R (red) channel, a feature vector corresponding to a G (green) channel and a feature vector corresponding to a B (blue) channel. That is, when the extracting unit 201 extracts the above sliding window features from the input image, the features are extracted respectively according to different color channels, so as to obtain feature vectors of the three channels, the feature vector of each channel including multiple values, and each value corresponding to one predefined position. And in this embodiment, a selection order of values in a feature vector corresponding to each channel relative to predefined positions of the sliding window may be fixed. For example, if in extracting the feature vector of the R channel, a red feature is extracted in a clockwise order of the predefine positions, in extracting the feature vector of the G channel and the feature vector of the B channel, a green feature and a blue feature are also extracted in a clockwise order of the predefine positions, respectively. Of course, this embodiment is not limited thereto.

Figures 3, 4:
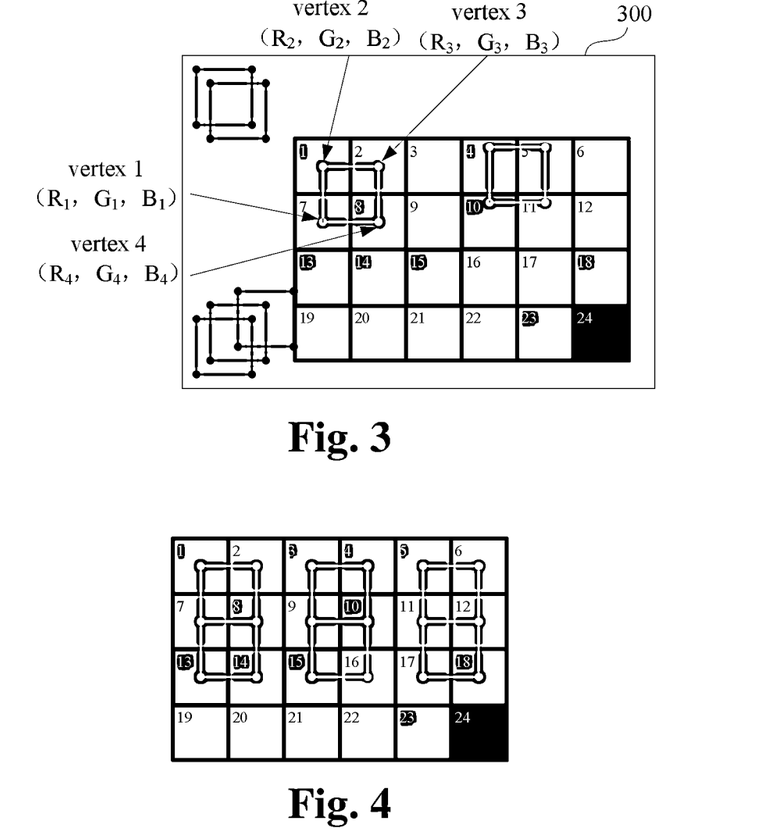
FIG. 3 is a schematic diagram of an example of extracting a feature by using a rectangular sliding window.
FIG. 4 is a schematic diagram of a sliding window template at different positions.

FIG. 3 is a schematic diagram of an example of extracting a feature by using a rectangular sliding window. As shown in FIG. 3, a predefined rectangular sliding window is used to scan the whole input image 300 point by point, and features are extracted from the input image 300 at each position to which the rectangular sliding window slides. In this example, extracting features to which the vertices of the rectangular sliding window correspond is taken as an example. The features corresponding to the four vertices of the rectangular sliding window are extracted by the extracting unit 201, which form three four-dimensional feature vectors, i.e. $\vec{R}$, $\vec{G}$ and $\vec{B}$, each feature vector corresponding to one color channel, the color channels being R channel, $\vec{R}=(R_1, R_2, R_3, R_4)$, G channel, $\vec{G}=(G_1, G_2, G_3, G_4)$, and B channel, $\vec{B}=(B_1, B_2, B_3, B_4)$, respectively. In this example, values of the feature vectors corresponding to the color channels are extracted in a clockwise order of the vertices of the rectangular sliding window, but as described above, the values of the feature vectors corresponding to the color channels may also be extracted in a counterclockwise order or another order, only if the orders are identical.

In this embodiment, as the features are extracted from each independent R, G and B channels, a variation of a relationship among the three R, G and B values (such as one resulted from wrong white balance setting) shall not affect a detection result.

In this embodiment, the selecting unit 202 is configured to find a matched sliding window from the above-described sliding windows at multiple positions, the matched sliding window being characterized in that it is located substantially at a central position of four colored squares, and each predefined position (such as the above-described vertex or equally-divided point) of which belongs to a different colored square, and hence a pixel to which the predefined position corresponds is a colored square pixel of the colored square.

In order to fine the above matched sliding window, in this embodiment, a concept of a sliding window template is defined. A sliding window template is a sliding window featuring a colored square of a standard color checker image, with its geometric structure being identical to that of the predefined sliding window used by the extracting unit 201, hence each sliding window template may feature four neighboring colored squares. Therefore, in this embodiment, sliding window templates corresponding to multiple positions may be defined as needed, each sliding window template being located at a center of four colored squares, and its feature vectors being constituted by standard RGB colors.

FIG. 4 is a schematic diagram of an example of a sliding window template. As shown in FIG. 4, if the rectangular sliding window in FIG. 3 is used, sliding window templates at six positions may be defined, which are respectively located at a center of colored squares 1, 2, 7 and 8, a center of colored squares 3, 4, 9 and 10, a center of colored squares 5, 6, 11 and 12, a center of colored squares 7, 8, 13 and 14, a center of colored squares 9, 10, 15 and 16, and a center of colored squares 11, 12, 17 and 18. Of course, the sliding window templates in FIG. 4 are examples only, and sliding window templates at more positions may be defined as needed, and the more the sliding window templates, the more precise the detection is.

Figure 5:
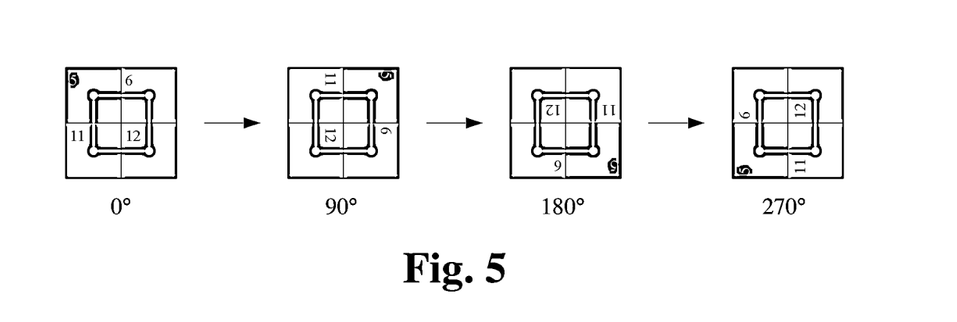
FIG. 5 is a schematic diagram of rotation of a sliding window template at a position.

Furthermore, taking that the standard color checker may rotate in the image into account, four templates of different rotation may be extracted corresponding to each position. For example, four templates may be obtained by clockwise rotation by 0°, 90°, 180° and 270° corresponding to each position. As shown in FIG. 5, in which four sliding window templates are shown, which are obtained by rotation of a sliding window template corresponding to a position of the center of the colored squares 5, 6, 11 and 12 by the above four angles. Therefore, total 24 sliding window templates are obtained corresponding to the above six positions.

In this embodiment, a matched sliding window corresponding to each sliding window template is found by comparing the sliding windows at each above-described position with the sliding window templates, according to the pixels to which the predefined positions of the matched sliding window correspond, and pixels of the colored squares where the predefined positions are located are obtained.

In an implementation, the selecting unit 202 includes: a calculating module 2021 and a first determining module 2022; wherein the calculating module 2021 is configured to calculate, for each sliding window template, a distance from a sliding window at each position to the sliding window template, and the first determining module 2022 is configured to take a sliding window of minimum distance as the matched sliding window of the sliding window template.

In this embodiment, in order to find the matched sliding window, a feature distance D between a sliding window and a sliding window template is defined. As each sliding window or sliding window template has three feature vectors (corresponding respectively to three color channels), there exists:

$$D = d_R + d_G + d_b \qquad (1);$$

where, $d_R$, $d_G$ and $d_B$ are feature distances to which each channel corresponds. As the feature distance between channels is completely identical, d is used to denote a feature distance of a certain channel. Assuming that $\vec{S}$ is a feature vector of a certain sliding window and $\vec{T}$ is a corresponding feature vector in a certain sliding window template, the feature distance d from $\vec{S}$ to $\vec{T}$ is calculated using a function f. However, due to different illumination, or the like, in a feature space, there exists a displacement of $\vec{S}$ relative to its real color value. Thus, taking the displacement $\Delta s$ of $\vec{S}$ into account, the function f is defined as:

$$d = f(\vec{S}, \vec{T}) = \underset{\Delta s}{\operatorname{argmin}} \left\| \vec{S} - \Delta s, \vec{T} \right\|^2; \qquad (2)$$

where, for any given $\Delta s$, f $(\vec{S}, \vec{T})$ will feed back an identical d. Finally, there will obtain the following formula with formulae (1) and (2):

$$D = d_R + d_G + d_b = f(\vec{R}, \vec{R}_T) + f(\vec{G}, \vec{G}_T) + f(\vec{B}, \vec{B}_T) \qquad (3;)$$

where, $\vec{R}$, $\vec{G}$ and $\vec{B}$ are feature vectors of the sliding window, and $\vec{R}_T$, $\vec{G}_T$ and $\vec{B}_T$ are corresponding feature vectors in the sliding window template. With formula (3), the distance D between any sliding window and sliding window template may be calculated. For a certain sliding window template, a sliding window most close to it is its best matched sliding window.

In this implementation, in f, a Euclidean distance may be used, and of course, other distances may also be used, and this embodiment is not limited thereto.

In this embodiment, as many other areas than the color checker exist in an image, the sliding window features extracted during a process of sliding of the predefined siding window in these areas are useless. Hence, in order to speed up operation, before finding the matched sliding window of the sliding window template, sliding windows at some positions may be filtered out first by a filter.

In another implementation of this embodiment, besides the calculating module 2021 and the first determining module 2022, the selecting unit 202 further includes: a filtering module 2023 configured to filter the sliding windows at the multiple positions by using a filter according to the sliding window features of the sliding windows at the multiple positions. In this implementation, the calculating module 2012 calculates distances from the sliding windows at the remaining positions to the sliding window template, thereby speeding up the calculation.

In this implementation, a dark center filter may be used to filter the above sliding windows at the multiple positions; wherein, it may be found by viewing the standard color checker that the colored squared are separated by black spacing lines. Therefore, as an expected target sliding window is at a central position of four colored squares, a color of a center of the sliding window should be black. Based upon this, with the black central filter, sliding windows with colors of centers being darker than colors of vertices may only be reserved.

In this implementation, a color variety filter may also be used to filter the above sliding windows at the multiple positions; wherein, it may be found by viewing the standard color checker that as the predefined positions (such as the four vertices) of the target sliding window are located in different colored squares, their colors should be different from each other. Based upon this, with the color variety filter, sliding windows with colors of vertices being different from each other may only be reserved.

The above two filters are examples only. And in particular implementation, the above two filters may be combined for use, and other types of filters may also be selected for use according to other factors, and this embodiment is not limited thereto.

In this embodiment, the matched sliding window of each sliding window template is determined, that is, a sliding window containing a colored square pixel is found. In this way, pixels to which the above predefined positions of the matched sliding window correspond may be obtained, and the pixel may be extracted for use in subsequent detection.

In this embodiment, the determining unit 203 may determine a precise position and a shape of each colored square according to the position of the above matched sliding window, i.e. pixels to which predefined positions of each matched sliding window correspond.

In one implementation, the determining unit 203 includes: a second determining module 2031 and a third determining module 2032; wherein, the second determining module 2031 determines an intermediate point of each two adjacent colored squares by using positions of pixel points corresponding to the predefined positions of each matched sliding window in the input image, and the third determining module 2032 determines the segmentation lines of the colored squares by using the intermediate point of each colored square, thereby determining a precise position and a shape of each colored square of the color checker in the image.

In this implementation, determination of an intermediate point between a colored square 14 and a colored square 15 is taken as an example.

Figure 6:
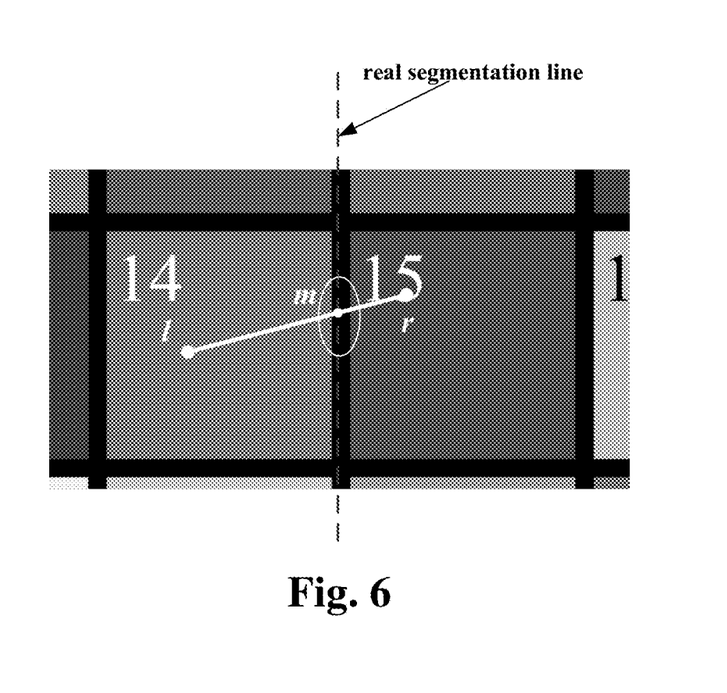
FIG. 6 is a schematic diagram of a position of an intermediate point of two adjacent colored squares.

As shown in FIG. 6, l and r are two points belonging respectively to a left colored square and a right colored square, and the two points are points in two colored squares where two predefined positions of a certain matched sliding window determined by the selecting unit 202 are located, an intersection m of a connection line of the two points and a real segmentation line is the intermediate point of the colored square 14 and the colored square 15. It can be seen from FIG. 6 that colors of points at the left color boundary from l to r along the connection line of the two points become gradually from the color of the left colored square 14 (green) into the color of the segmentation line (black); and colors of points at the right color boundary become gradually from the color of the segmentation line into the color of the right colored square 15 (red). Colors of other point in the connection line are in consistence with the colors of the colored squares or the segmentation lines. And a mathematical model may be set up based on such observation.

Figure 7:
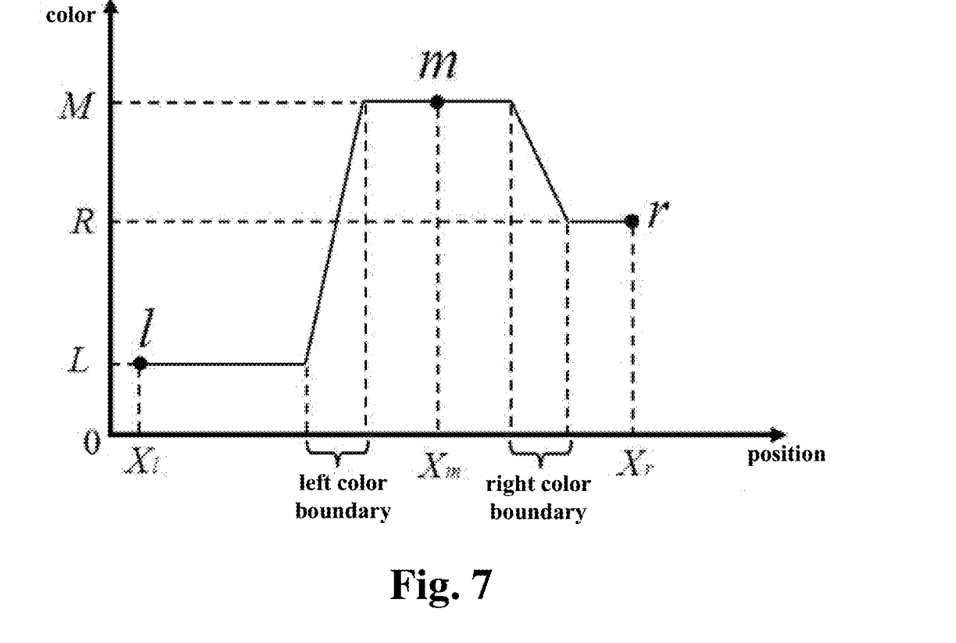
FIG. 7 is a curve of a color of the point in FIG. 6 varying along with variation of a position.

Assuming that only a color of a certain color channel is taken into account, a color value is a scale. L, M and R are used to denote respectively colors of points l, m and r, and $X_l$, $X_m$ and $X_r$ are used to denote respectively positions of the points l, m and r in the connection line. Assuming that a color value is linearly varying transition at a color boundary, a curve of FIG. 7 may be obtained, which shows how color values of points vary along with variation of positions. Assuming that p is used to denote an arbitrary point in the connection line, its position being denoted by $x \in (X_l, X_r)$, and P is used to denote a color of p. A color distance d from p to l or r may be calculated by a function g:

$$d = g(x) = \max(|P-L|, |P-R|) \qquad (4).$$

Figure 8:
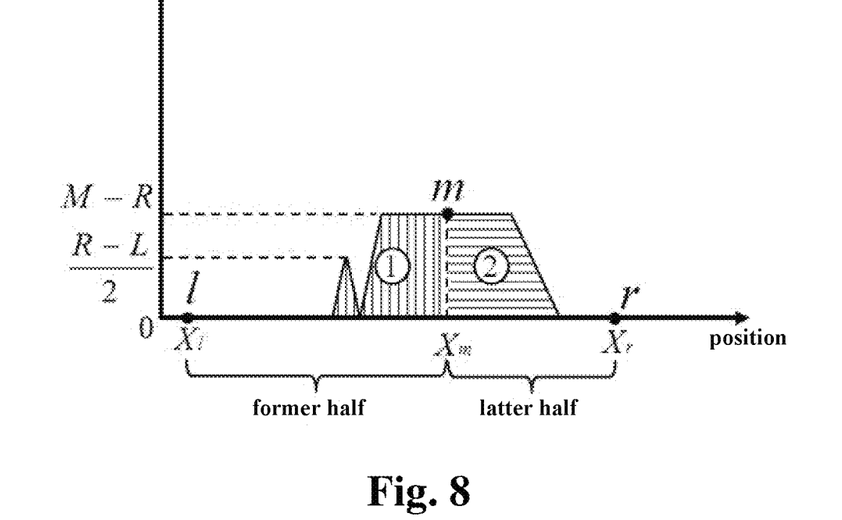
FIG. 8 is a schematic diagram of a relationship between the position and color distance in FIG. 7.

The curve shown in FIG. 8 may be obtained after calculating the color distance by using formula (4). In the new curve, the areas of the shadowed zone 1 and the shadowed zone 2 are substantially equal to each other, hence the integral of the former half curve should be substantially equal to the integral of the latter half curve, and $$\int_{X_l}^{X_m} g(x)dx \approx \int_{X_m}^{X_r} g(x)dx.$$

Therefore, a position $X_m$ of an intermediate point of two adjacent colored squares may be calculated by using the following formula:

$$X_m \approx \frac{\int_{X_l}^{X_r} g(x) x \, dx}{\int_{X_l}^{X_r} g(x) dx}. \qquad (5)$$

The position of the above intermediate point may be obtained through $X_m$. As a colored value consists of three color channels —RGB, formula (4) may be:

$$d=g(x)=\max(\|\vec{P}-\vec{L}\|,\|\vec{P}-\vec{R}\|);$$

where, $\vec{P}$, $\vec{L}$ and $\vec{R}$ denote respectively color vectors of RGB.

Figure 9:
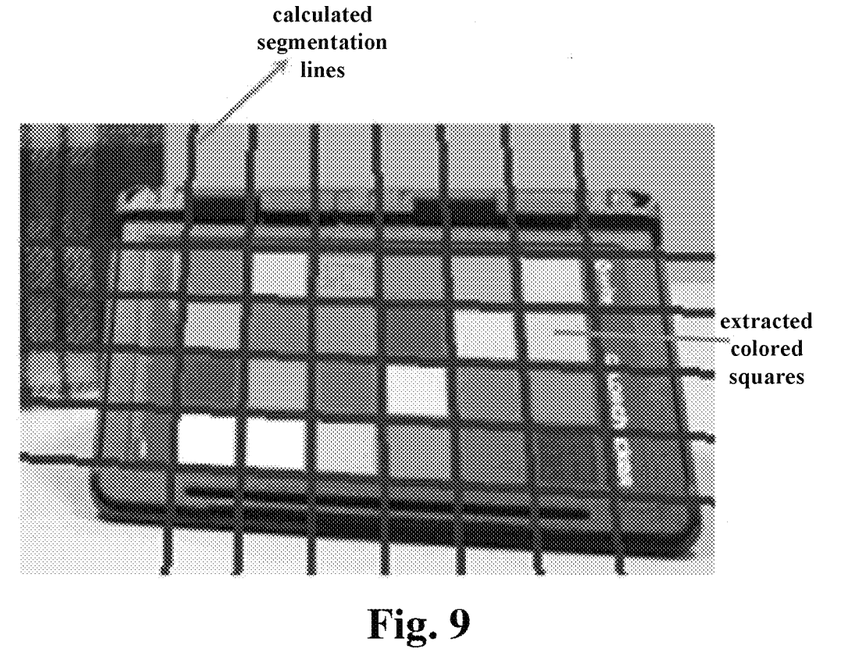
FIG. 9 is a schematic diagram of a detection result.

In this embodiment, segment lines of all colored squares may be finally obtained by using an existing linear fitting method, such as a least squares linear fitting method, after the positions of the intermediate points are obtained. FIG. 9 shows an example of finally obtaining segmentation lines of colored squares.

In this embodiment, the colored square pixel extracted according to the matched sliding window is used to find an intermediate point of the colored squares and find out segmentation lines of the colored squares, and precise positions and shapes of all the colored squares may be obtained via the segmentation lines.

In this embodiment, in order to avoid incorrectness of the detection result, the detection result may be checked. And in an implementation of this embodiment, the apparatus further includes a checking unit 204 configured to check the colored squares segmented by the segmentation lines, and determine that the colored squares segmented by the segmentation lines are colored squares of the above color checker if variance of an area color value of each colored square is less than a first threshold value and a difference of colors between different colored squares is less than a second threshold value, otherwise, replace the predefined sliding window, and provide the replaced predefined sliding window to the extracting unit 201, so as to repeat a process of detection.

In this implementation, the detection result is checked by judging whether the variance of the area color value of each colored square and whether the difference of colors between different colored square areas satisfy all conditions; and if yes, the whole process of detection is terminated; otherwise, the predefined sliding window is replaced with another predefined sliding window of a different size or rotation, so as to repeat the whole process of detection.

Figure 10:
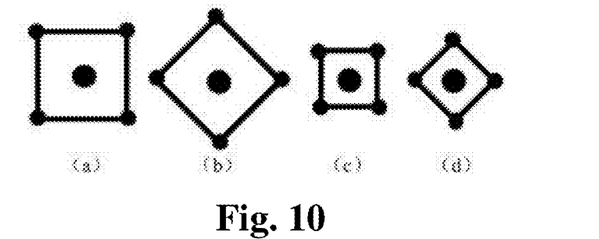
FIG. 10 is schematic diagrams of four implementations of a predefined sliding window.

FIG. 10 is an example of predefined sliding windows of different sizes or rotation. In this example, four rectangular sliding windows are predefined, in which sizes of a first sliding window (a) and a second sliding window (b) are identical, and the second sliding window (b) is rotated by 45° relative to the first sliding window (a); and sizes of a third sliding window (c) and a fourth sliding window (d) are identical and are less than those of the first sliding window (a) and the second sliding window (b), and the fourth sliding window (d) is rotated by 45° relative to the third sliding window (c).

In this embodiment, reliability of the extracted colored squares is checked by result checking; and if the checking is passed, the whole detection is terminated; otherwise, the predefined sliding window is replaced with another rectangular sliding window of a different size or rotation, so as to repeat the whole process.

With the apparatus of this embodiment, a new manner of detecting by features of independent RGB channels and a geometric structure of the color checker is proposed. Compared with other manners, the manner of this embodiment is faster and better in robustness, and a color checker may still be detected from a picture of a relatively large color deviation. Furthermore, the method of this embodiment can give accurately information on a position and shape of each colored square in the color checker.

Embodiment 2

An embodiment of the present application further provides a method for detecting a color checker in an image, as described below. As the principle of the method for solving problems is similar to that of the apparatus in Embodiment 1, the implementation of the apparatus in Embodiment 1 is referred to for the implementation of the method, and the repeated parts shall not be described any further.

Figure 11:
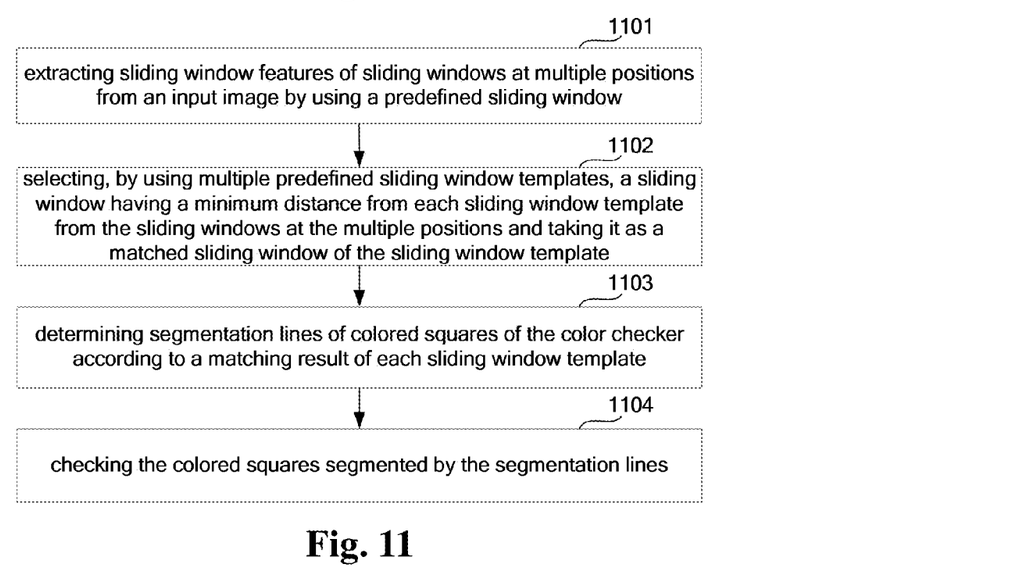
FIG. 11 is a flowchart of the method for detecting a color checker in an image of an embodiment of the present application.

FIG. 11 is a flowchart of the method for detecting a color checker in an image of an embodiment of the present application. Referring to FIG. 11, the method includes:

step 1101: extracting sliding window features of sliding windows at multiple positions from an input image by using a predefined sliding window;

step 1102: selecting, by using multiple predefined sliding window templates, a sliding window having a minimum distance from each sliding window template from the sliding windows at the multiple positions and taking it as a matched sliding window of the sliding window template; and step 1103: determining segmentation lines of colored squares of the color checker according to a matching result of each sliding window template.

In an implementation of this embodiment, in step 1101, the predefined sliding window may be used to scan the whole input image point by point, extracting a feature at each position passed by the predefined sliding window, and taking it as the sliding window feature of a sliding window of the predefined sliding window at the position.

In an implementation of this embodiment, the extracted features are features corresponding to the predefined positions of the predefined sliding windows in the input image, and a sliding window feature of the sliding window of the predefined sliding window at each position includes: a feature vector corresponding to an R channel, a feature vector corresponding to a G channel and a feature vector corresponding to a B channel. Furthermore, a selection order of values in the feature vector corresponding to each channel relative to the sliding window may be fixed.

In an implementation of this embodiment, step 1102 may include:

S11: for each sliding window template, calculating a distance between a sliding window at each position and the sliding window template; and S12: taking a sliding window having a minimum distance as a matched sliding window of the sliding window template.

Optionally, before S11, it may further include:

S10: filtering the sliding windows at the multiple positions by using a filter according to the sliding window features of the sliding windows at the multiple positions, so as to calculate distances between sliding windows at remaining positions and the sliding window templates.

In this embodiment, for each sliding window template, the distance between a sliding window at each position and the sliding window template may be calculated according to a formula below:

$$D=d_R+d_G+d_b=f(\vec{R},\vec{R}_T)+f(\vec{G},\vec{G}_T)+f(\vec{B},\vec{B}_T);$$

where, $\vec{R}$, $\vec{G}$ and $\vec{B}$ are feature vectors of the R channel, the G channel and the B channel of the sliding window, respectively, $\vec{R}_T$, $\vec{G}_T$ and $\vec{B}_T$ are feature vectors of the corresponding R channel, G channel and B channel in the sliding window template, $$d = f(\vec{S}, \vec{T}) = \underset{\Delta s}{\arg\min} \left\| \vec{S} - \Delta s, \vec{T} \right\|^2,$$

$\vec{S}$ is a feature vector of the R channel, the G channel, or the B channel of the sliding window, $\vec{T}$ is a feature vector the corresponding R channel, G channel, or B channel in the sliding window template, $\Delta s$ is displacement of $\vec{S}$.

In an implementation of this embodiment, step 1103 may include:

S21: determining an intermediate point of every two adjacent colored squares by using positions of pixel points corresponding to predefined positions of each matched sliding window in the input image; and S22: determining the segmentation lines of the colored squares by using intermediate points of the colored squares.

In this implementation, the position of the intermediate point of every two adjacent colored squares may be determined according to the formula below:

$$X_m \approx \frac{\int_{X_l}^{X_r} g(x) x \, dx}{\int_{X_l}^{X_r} g(x) \, dx};$$

where, $d = g(x) = \max(\|\vec{P} - \vec{L}\|, \|\vec{P} - \vec{R}\|)$, $\vec{P}$, $\vec{L}$ and $\vec{R}$ are RGB color vectors, $X_l$ denotes a position of a pixel point in a first colored square, $X_m$ denotes a position of a intermediate point, and $X_r$ denotes a position of a pixel point in a second colored square.

In an implementation of this embodiment, the method may further include:

step 1104: checking the colored squares segmented by the segmentation lines, and determining that the colored squares segmented by the segmentation lines are colored squares of the color checker if variance of an area color value of each colored square is less than a first threshold value and a difference of colors between different colored squares is less than a second threshold value, otherwise, replace the predefined sliding window, and repeat a process of detection.

Figure 12:
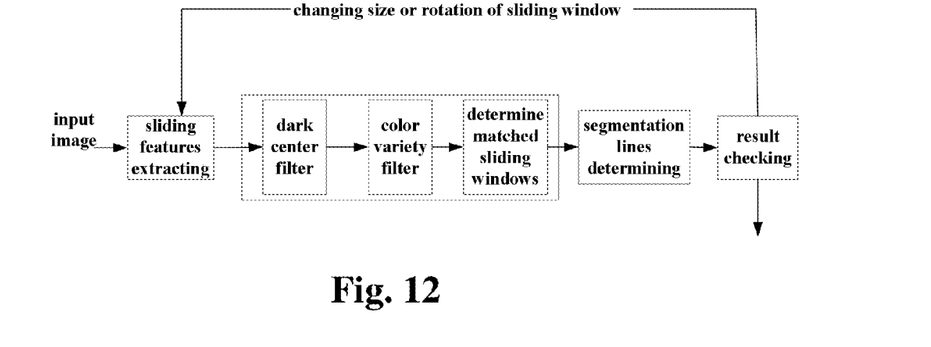
FIG. 12 is a flowchart of processing of the method for detecting a color checker in an image of an embodiment of the present application.

FIG. 12 is a flowchart of processing of the method for detecting a color checker in an image of an embodiment of the present application. As shown in FIG. 12, a sliding feature extracting is performed on an input image first, then in a process of coarse detection, a dark center filter is used first to filter out a part of sliding windows, and then a color variety filter is used to filter out another part of sliding windows, thereafter, sliding window templates are used to find out matched sliding windows, and pixels to which predefined positions of the matched sliding windows correspond are extracted, and then fine detection is performed, so as to determine the intermediate point of every two adjacent colored squares, and hence the segmentation lines of the colored squares are determined, thereby positions of the colored squares are determined, and finally, a detection result may be checked, and processing is terminated if the detection is passed; otherwise, the predefined sliding window is replaced and the above process of detection is continued; wherein, the processes of detection shown in FIG. 12 have been described in detail above, and shall not be described herein any further.

With the method of this embodiment, a new manner of detecting by features of independent RGB channels and a geometric structure of the color checker is proposed. Compared with other manners, the manner of this embodiment is faster and better in robustness, and a color checker may still be detected from a picture of a relatively large color deviation. Furthermore, in the method of this embodiment can give accurately information on a position and shape of each colored square in the color checker.

Embodiment 3

An embodiment of the present application further provides electronic equipment, including the apparatus for detecting a color checker in an image described in Embodiment 1.

Figure 13:
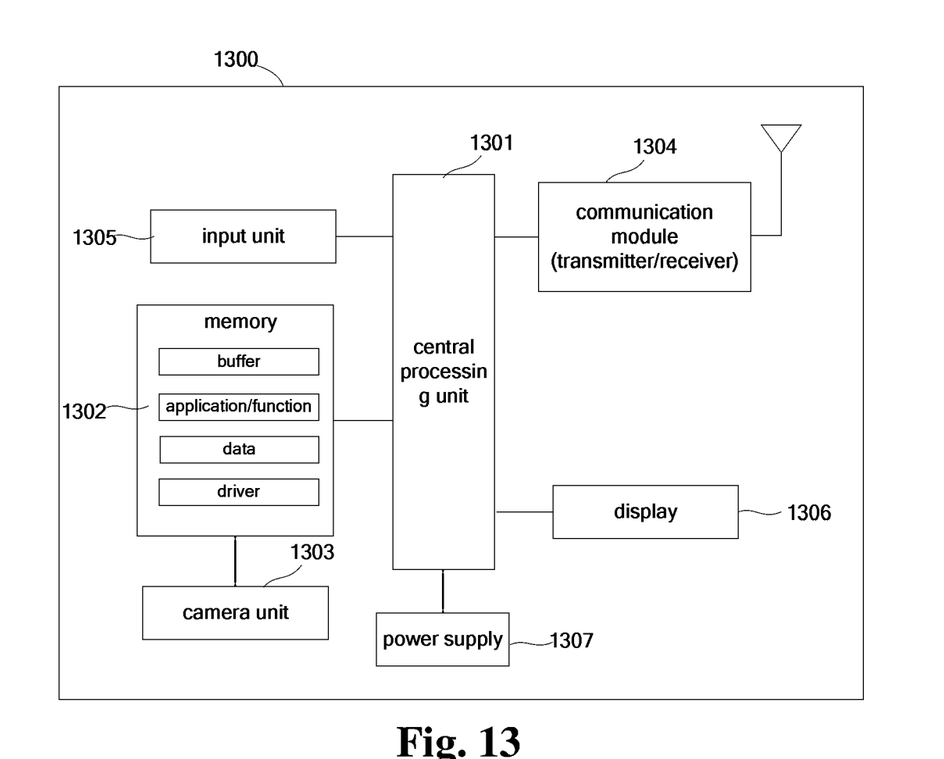
FIG. 13 is a schematic diagram of the structure of the electronic equipment of an embodiment of the present application.

FIG. 13 is a schematic diagram of the structure of the electronic equipment of an embodiment of the present application. As shown in FIG. 13, the electronic equipment 1300 may include a central processing unit 1301 and a memory 1302, the memory 1302 being coupled to the central processing unit 1301. This figure is exemplary only, and other types of structures may be used to supplement or replace this structure for the realization of telecommunications functions or other functions.

As shown in FIG. 13, the electronic equipment 1300 may further include a camera unit 1303, a communication module 1304, and input unit 1305, a display 1306, and a power supply 1307, etc.; wherein, the camera unit 1303 inputs a captured image into the memory 1302 for storing.

In an implementation, functions of apparatus for detecting a color checker in an image may be integrated into the central processing unit 1301; wherein, the central processing unit 1301 may be configured to: extract sliding window features of sliding windows at multiple positions from an input image by using a predefined sliding window; select, by using multiple predefined sliding window templates, a sliding window having a minimum distance from each sliding window template from the sliding windows at the multiple positions and take it as a matched sliding window of the sliding window template; and determine segmentation lines of colored squares of the color checker according to sliding window features of a matching sliding window of each sliding window template;

wherein, when the central processing unit 1301 is configured to extract sliding window features of sliding windows at multiple positions from an input image by using a predefined sliding window, it may be particularly configured to: scan the whole input image point by point by using the predefined sliding window, extract a feature at each position passed by the predefined sliding window, and take it as the sliding window feature of a sliding window of the predefined sliding window at the position;

wherein, the extracted feature is a feature corresponding to a predefined position of the predefined sliding window in the input image; and the sliding window feature of the sliding window of the predefined sliding window at each position includes: a feature vector corresponding to an R channel, a feature vector corresponding to a G channel and a feature vector corresponding to a B channel; wherein, a selection order of values in a feature vector corresponding to each channel relative to the sliding window may be fixed;

wherein, when the central processing unit 1301 is configured to find a sliding window having a minimum distance from each sliding window template from the sliding windows at the multiple positions and take it as a matched sliding window of the sliding window template, it may be particularly configured to: for each sliding window template, calculate a distance from a sliding window at each position to the sliding window template, and take a sliding window of minimum distance as the matched sliding window of the sliding window template;

wherein, before the central processing unit 1301 is configured to calculate a distance from a sliding window at each position to the sliding window template, it may further be configured to filter the sliding windows at the multiple positions by using a filter according to the sliding window features of the sliding windows at the multiple positions, so as to calculate distances from the sliding windows at the remaining positions to the sliding window template;

wherein, the central processing unit 1301 may be configured to calculate the distance from the sliding window at each position to the sliding window template according to the following formula:

$$D = d_R + d_G + d_b = f(\vec{R}, \vec{R_T}) + f(\vec{G}, \vec{G_T}) + f(\vec{B}, \vec{B_T});$$

where, $\vec{R}, \vec{G}, \vec{B}$ are feature vectors of the R channel, G channel and B channel of the sliding window, respectively;

$\vec{R_T}, \vec{G_T}, \vec{B_T}$ are feature vectors of corresponding R channel, G channel and B channel in the sliding window template, respectively;

and $$d = f(\vec{S}, \vec{T}) = \underset{\Delta s}{\mathrm{argmin}} \left\| \vec{S} - \Delta s, \vec{T} \right\|^2,$$

$\vec{S}$ being the feature vector of the R channel, G channel or B channel, of the sliding window, $\vec{T}$ being the feature vector of corresponding R channel, G channel or B channel, in the sliding window template, and $\Delta s$ being displacement of $\vec{S}$;

wherein, when the central processing unit 1301 is configured to determine segmentation lines of colored squares of the color checker according to a matching result of each sliding window template, it may be configured to: determine an intermediate point of each two adjacent colored squares by using positions of pixel points corresponding to the predefined positions of each matched sliding window in the input image, and determine the segmentation lines of the colored squares by using the intermediate points of the colored squares;

wherein, the central processing unit 1301 may be configured to determine the intermediate point of each two adjacent colored squares according to the following formula:

$$X_m \approx \frac{\int_{X_l}^{X_r} g(x) x \, dx}{\int_{X_l}^{X_r} g(x) \, dx};$$

where, $d = g(x) = \max(\|\vec{P} - \vec{L}\|, \|\vec{P} - \vec{R}\|)$, $\vec{P}, \vec{L}$ and $\vec{R}$ being RGB color vectors, $X_l$ denotes a position of a pixel point in a first colored square, $X_m$ denotes a position of an intermediate point, and $X_r$ denotes a position of a pixel point in a second colored square;

wherein, the central processing unit 1301 may further be configured to: check the colored squares segmented by the segmentation lines, and determine that the colored squares segmented by the segmentation lines are colored squares of the color checker if variance of an area color value of each colored square is less than a first threshold value and a difference of colors between different colored squares is less than a second threshold value, otherwise, replace the predefined sliding window, repeat a process of detection.

In another implementation, the apparatus for detecting a color checker in an image and the central processing unit 1301 may be configured separately. For example, the apparatus for detecting a color checker in an image may be configured as a chip connected to the central processing unit 1301, with the functions of the apparatus for detecting a color checker in an image being realized under control of the central processing unit 1301.

The electronic equipment 1300 does not necessarily include all the parts shown in FIG. 13.

As shown in FIG. 13, the central processing unit 1301 is sometimes referred to as a controller or control, and may include a microprocessor or other processor devices and/or logic devices. The central processing unit 1301 receives input and controls operations of every components of the electronic equipment 1300.

The memory 1302 may be, for example, one or more of a buffer memory, a flash memory, a hard drive, a mobile medium, a volatile memory, a nonvolatile memory, or other suitable devices, which may store the above information, and may further store a program executing related information. And the central processing unit 1301 may execute the program stored in the memory 1302, so as to realize information storage or processing, etc. Functions of other parts are similar to those of the relevant art, which shall not be described herein any further. The parts of the electronic equipment 1300 may be realized by specific hardware, firmware, software, or any combination thereof, without departing from the scope of this application.

In this embodiment, the electronic equipment is, for example, a portable radio communication apparatus, which includes all apparatuses such as mobile telephones, smart mobile phones, pagers, communicators, electronic organizers, personal digital assistants (PDAs), smartphones, portable communication devices or the like. Furthermore, the electronic equipment may be equipment with a function of a video camera, and such equipment may have no function of communication, such as a microscope, a camera, and a video camera, etc. And a type of the electronic equipment is not limited in the embodiments of the present application.

With the electronic equipment of this embodiment, automatic detection of a color checker in an image is achieved based on features of independent RGB channels and a geometric structure of the color checker, which speeds up the detection and improves robustness.

The above embodiments are described taking the standard color checker containing 24 colored squares shown in FIG. 1 as an example. However, these embodiments are not limited thereto, and detection of a color checker in an image may be performed following the principle of the present application, no matter how many colored squares of the standard color checker exist. Different from a standard color checker containing 24 colored squares, a sliding window template needs to be redefined according to the number of colored squares in the standard color checker, which shall not be described herein any further.

An embodiment of the present application further provides a computer-readable program, wherein when the program is executed in an apparatus for detecting a color checker in an image or electronic equipment, the program enables the computer to carry out the method for detecting a color checker in an image as described in Embodiment 2 in the apparatus for detecting a color checker in an image or the electronic equipment.

An embodiment of the present application further provides a storage medium in which a computer-readable program is stored, wherein the computer-readable program enables the computer to carry out the method for detecting a color checker in an image as described in Embodiment 2 in an apparatus for detecting a color checker in an image or electronic equipment.

The above apparatuses and methods of the present application may be implemented by hardware, or by hardware in combination with software. The present application relates to such a computer-readable program that when the program is executed by a logic device, the logic device is enabled to carry out the apparatus or components as described above, or to carry out the methods or steps as described above. The present application also relates to a storage medium for storing the above program, such as a hard disk, a floppy disk, a CD, a DVD, and a flash memory, etc.

The present application is described above with reference to particular embodiments. However, it should be understood by those skilled in the art that such a description is illustrative only, and not intended to limit the protection scope of the present application. Various variants and modifications may be made by those skilled in the art according to the principle of the present application, and such variants and modifications fall within the scope of the present application.

For the implementation of the present application containing the above embodiments, following supplements are further disclosed.

Supplement 1. An apparatus for detecting a color checker in an image, comprising:

an extracting unit configured to extract sliding window features of sliding windows at multiple positions from an input image by using a predefined sliding window;

a selecting unit configured to select, by using multiple predefined sliding window templates, a sliding window having a minimum distance from each sliding window template from the sliding windows at the multiple positions and take it as a matched sliding window of the sliding window template; and a determining unit configured to determine segmentation lines of colored squares of a color checker in the input image according to a matching result of each sliding window template.

Supplement 2. The apparatus according to supplement 1, wherein the extracting unit scans the whole of the input image point by point by using the predefined sliding window, extracts a feature at each position passed by the predefined sliding window, and takes it as the sliding window feature of a sliding window of the predefined sliding window at the position.

Supplement 3. The apparatus according to supplement 2, wherein, the feature extracted by the extracting unit is a feature corresponding to a predefined position of the predefined sliding window in the input image;

and the sliding window feature of the sliding window of the predefined sliding window at each position includes: a feature vector corresponding to an R channel, a feature vector corresponding to a G channel and a feature vector corresponding to a B channel.

Supplement 4. The apparatus according to supplement 1, wherein the selecting unit comprises:

a calculating module configured to calculate, for each sliding window template, a distance from a sliding window at each position to the sliding window template; and a first determining module configured to take a sliding window of minimum distance as the matched sliding window of the sliding window template.

Supplement 5. The apparatus according to supplement 4, wherein the selecting unit further comprises:

a filtering module configured to filter the sliding windows at the multiple positions by using a filter according to the sliding window features of the sliding windows at the multiple positions; and the calculating module calculates distances from the sliding windows at the remaining positions to the sliding window template.

Supplement 6. The apparatus according to supplement 4, wherein the calculating module calculates the distance from the sliding window at each position to the sliding window template according to the following formula:

$$D = d_R + d_G + d_b = f(\vec{R}, \vec{R}_T) + f(\vec{G}, \vec{G}_T) + f(\vec{B}, \vec{B}_T);$$

where, $\vec{R}, \vec{G}, \vec{B}$ are feature vectors of the R channel, G channel and B channel of the sliding window, respectively;

$\vec{R}_T, \vec{G}_T, \vec{B}_T$ are feature vectors of corresponding R channel, G channel and B channel in the sliding window template, respectively;

and $$d = f(\vec{S}, \vec{T}) = \underset{\Delta s}{\mathrm{argmin}} \left\| \vec{S} - \Delta s, \vec{T} \right\|^2,$$

$\vec{S}$ being the feature vector of the R channel, G channel or B channel, of the sliding window, $\vec{T}$ being corresponding feature vector of the R channel, G channel or B channel in the sliding window template, and $\Delta s$ being displacement of $\vec{S}$.

Supplement 7. The apparatus according to supplement 1, wherein the determining unit comprises:

a second determining module configured to determine an intermediate point of each two adjacent colored squares by using positions of pixel points corresponding to the predefined positions of each matched sliding window in the input image; and a third determining module configured to determine the segmentation lines of the colored squares by using the intermediate points of the colored squares.

Supplement 8. The apparatus according to supplement 7, wherein the second determining module determines the intermediate point of each two adjacent colored squares according to the following formula:

$$X_m \approx \frac{\int_{X_l}^{X_r} g(x)x dx}{\int_{X_l}^{X_r} g(x) dx};$$

where, $d=g(x)=\max(\|\vec{P}-\vec{L}\|,\|\vec{P}-\vec{R}\|)$, $\vec{P}$, $\vec{L}$ and $\vec{R}$ being RGB color vectors, $X_l$ denotes a position of a pixel point in a first colored square, $X_m$ denotes a position of an intermediate point, and $X_r$ denotes a position of a pixel point in a second colored square.

Supplement 9. The apparatus according to supplement 1, wherein the apparatus further comprises:

a checking unit configured to check the colored squares segmented by the segmentation lines, and determine that the colored squares segmented by the segmentation lines are colored squares of the color checker if variance of an area color value of each colored square is less than a first threshold value and a difference of color between different colored squares is less than a second threshold value, otherwise, replace the predefined sliding window, and provide the replaced predefined sliding window to the extracting unit, so as to repeat a process of detection.

Supplement 10. A method for detecting a color checker in an image, comprising:

extracting sliding window features of sliding windows at multiple positions from an input image by using a predefined sliding window;

selecting, by using multiple predefined sliding window templates, a sliding window having a minimum distance from each sliding window template from the sliding windows at the multiple positions and taking it as a matched sliding window of the sliding window template; and determining segmentation lines of colored squares of the color checker according to a matching result of each sliding window template.

Supplement 11. The method according to supplement 10, wherein the extracting sliding window features of sliding windows at multiple positions from an input image by using a predefined sliding window comprises:

scanning the whole of the input image point by point by using the predefined sliding window, extracting a feature at each position passed by the predefined sliding window, and taking it as the sliding window feature of a sliding window of the predefined sliding window at the position.

Supplement 12. The method according to supplement 11, wherein, the extracted features are features corresponding to the predefined positions of the predefined sliding windows in the input image;

and a sliding window feature of the sliding window of the predefined sliding window at each position includes: a feature vector corresponding to an R channel, a feature vector corresponding to a G channel and a feature vector corresponding to a B channel.

Supplement 13. The method according to supplement 10, wherein the selecting, by using multiple predefined sliding window templates, a sliding window having a minimum distance from each sliding window template from the sliding windows at the multiple positions and taking it as a matched sliding window of the sliding window template comprises:

for each sliding window template, calculating a distance between a sliding window at each position and the sliding window template; and taking a sliding window having a minimum distance as a matched sliding window of the sliding window template.

Supplement 14. The method according to supplement 13, wherein before calculating a distance between a sliding window at each position and the sliding window template, the method further comprises:

filtering the sliding windows at the multiple positions by using a filter according to the sliding window features of the sliding windows at the multiple positions, so as to calculate a distance between sliding windows at remaining positions and the sliding window template.

Supplement 15. The method according to supplement 13, wherein for each sliding window template, the distance between the sliding window at each position and the sliding window template may be calculated according to a formula below:

$$D=d_R+d_G+d_b=f(\vec{R},\vec{R}_T)+f(\vec{G},\vec{G}_T)+f(\vec{B},\vec{B}_T);$$

where, $\vec{R}$, $\vec{G}$ and $\vec{B}$ are feature vectors of the R channel, the G channel and the B channel of the sliding window, respectively, $\vec{R}_T$, $\vec{G}_T$ and $\vec{B}_T$ are feature vectors of the corresponding R channel, G channel and B channel in the sliding window template, $$d = f(\vec{S}, \vec{T}) = \operatorname*{argmin}_{\Delta s} \left\| \vec{S} - \Delta s, \vec{T} \right\|^2,$$

$\vec{S}$ is a feature vector of the R channel, the G channel, or the B channel of the sliding window, $\vec{T}$ is a feature vector the corresponding R channel, G channel, or B channel in the sliding window template, $\Delta s$ is displacement of $\vec{S}$.

Supplement 16. The method according to supplement 10, wherein the determining segmentation lines of colored squares of the color checker according to a matching result of each sliding window template comprises:

determining an intermediate point of every two adjacent colored squares by using positions of pixel points corresponding to the predefined positions of each matched sliding window in the input image; and determining the segmentation lines of the colored squares by using intermediate points of the colored squares.

Supplement 17. The method according to supplement 16, wherein the position of intermediate point of every two adjacent colored squares is determined according to the formula below:

$$X_m \approx \frac{\int_{X_l}^{X_r} g(x)x dx}{\int_{X_l}^{X_r} g(x) dx};$$

where, $d=g(x)=\max(\|\vec{P}-\vec{L}\|,\|\vec{P}-\vec{R}\|)$, $\vec{P}$, $\vec{L}$ and $\vec{R}$ are RGB color vectors, $X_l$ denotes a position of a pixel point in a first colored square, $X_m$ denotes the position of the intermediate point, and $X_r$ denotes a position of a pixel point in a second colored square.

Supplement 18. The method according to supplement 10, wherein the method further comprises:
checking the colored squares segmented by the segmentation lines, and determining that the colored squares segmented by the segmentation lines are colored squares of the color checker if variance of an area color value of each colored square is less than a first threshold value and a difference of color between different colored squares is less than a second threshold value, otherwise, replace the predefined sliding window, and repeat a process of detection.

Supplement 19. Electronic equipment, comprising an apparatus for detecting a color checker in an image, the apparatus for detecting a color checker in an image being configured to:
extract sliding window features of sliding windows at multiple positions from an input image by using a predefined sliding window;
select, by using multiple predefined sliding window templates, a sliding window having a minimum distance from each sliding window template from the sliding windows at the multiple positions and take it as a matched sliding window of the sliding window template; and
determine segmentation lines of colored squares of the color checker according to a matching result of each sliding window template.

The invention claimed is:

1. An apparatus for detecting a color checker in an image, comprising:
a memory that stores a plurality of instructions; and
a processor coupled to the memory and configured to execute the instructions to:
extract sliding window features of sliding windows at multiple positions from an input image using a predefined sliding window;
select, using multiple predefined sliding window templates, a sliding window having a minimum distance from each sliding window template from the sliding windows at the multiple positions as a matched sliding window of the sliding window template; and
determine segmentation lines of colored squares of a color checker in the input image according to a matching result of each sliding window template,
wherein, the processor is configured to execute the instructions to: scan the whole of the input image point by point by using the predetermined sliding window, extract a feature at each position passed by the predefined sliding window, and take it as the sliding window feature of a sliding window of the predetermined sliding window at the position,
the extracted feature is a feature corresponding to a predefined position of the predefined sliding window in the input image; and the sliding window feature of the sliding window of the predefined sliding window at each position includes: a feature vector corresponding to an R channel, a feature vector corresponding to a G channel and a feature vector corresponding to a B channel,
the processor is configured to execute the instructions to: determine an intermediate point of each two adjacent colored squares by using positions of pixel points corresponding to the predefined positions of each matched sliding window in the input image; and determine the segmentation lines of the colored squares by using the intermediate points of the colored squares,
the processor is configured to execute the instructions to determine the intermediate point of each two adjacent colored squares according to the following formula:

$$X_m \approx \frac{\int_{X_l}^{X_r} g(x)x\,dx}{\int_{X_l}^{X_r} g(x)\,dx};$$

where, $d=g(x)=\max(\|\vec{P}-\vec{L}\|, \|\vec{P}-\vec{R}\|)$, $\vec{P}$, $\vec{L}$, $\vec{R}$ being RGB color vectors, $X_l$ denotes a position of a pixel point in a first colored square, $X_m$ denotes a position of an intermediate point, and $X_r$ denotes a position of a pixel point in a second colored square.

2. The apparatus according to claim 1, wherein the processor is configured to execute the instructions to:
calculate, for each sliding window template, a distance from a sliding window at each position to the sliding window template; and
take a sliding window of minimum distance as the matched sliding window of the sliding window template.

3. The apparatus according to claim 2, wherein
the processor is further configured to execute the instructions to:
filter the sliding windows at the multiple positions using a filter according to the sliding window features of the sliding windows at the multiple positions; and calculates distances from the sliding windows at the remaining positions to the sliding window template.

4. The apparatus according to claim 2, wherein the processor is configured to execute the instructions to calculate the distance from the sliding window at each position to the sliding window template according to the following formula:

$$D = d_R + d_G + d_b = f(\vec{R}, \vec{R}_T) + f(\vec{G}, \vec{G}_T) + f(\vec{B}, \vec{B}_T);$$

where,
$\vec{R}$, $\vec{G}$, $\vec{B}$ are feature vectors of the R channel, G channel and B channel of the sliding window, respectively;
$\vec{R}_T$, $\vec{G}_T$, $\vec{B}_T$ are feature vectors of corresponding R channel, G channel and B channel in the sliding window template, respectively;
and $$d = f(\vec{S}, \vec{T}) = \underset{\Delta s}{\operatorname{argmin}} \|\vec{S} - \Delta s, \vec{T}\|^2,$$

$\vec{S}$ being the feature vector of the R channel, G channel or B channel, of the sliding window, $\vec{T}$ being a corresponding vector of the R channel, G channel or B channel, in the sliding window template, and $\Delta S$ being displacement of $\vec{S}$.

5. The apparatus according to claim 1, wherein the processor is further configured to execute the instructions to:
check the colored squares segmented by the segmentation lines, and determine that the colored squares segmented by the segmentation lines are colored squares of the color checker if variance of an area color value of each colored square is less than a first threshold value and a difference of color between different colored squares is less than a second threshold value, if not, replace the predefined sliding window, and extract sliding window features of sliding windows at multiple positions from the input image by using the replaced predefined sliding window, so as to repeat a process of detection.

6. A method for detecting a color checker in an image, comprising:

extracting sliding window features of sliding windows at multiple positions from an input image using a predefined sliding window;

selecting, using multiple predefined sliding window templates, a sliding window having a minimum distance from each sliding window template from the sliding windows at the multiple positions as a matched sliding window of the sliding window template; and determining segmentation lines of colored squares of the color checker according to a matching result of each sliding window template, wherein, the extracting sliding window features of sliding windows at multiple positions from an input image by using a predefined sliding window comprises: scanning the whole of the input image point by point by using the predefined sliding window extracting a feature at each position passed by the predefined sliding window, and taking it as the sliding window feature of a sliding window of the predefined sliding window at the position, the extracted features are features corresponding to the predefined positions of the predefined sliding window in the input image; and a sliding window feature of the sliding window of the predefined sliding window at each position includes: a feature vector corresponding to an R channel, a feature vector corresponding to a G channel and a feature vector corresponding to a B channel, the determining segmentation lines of colors squares of the color checker according to a matching result of each sliding window template comprises: determining an intermediate point of every two adjacent colored squares by using positions of pixel points corresponding to the predefined positions of each matched sliding window in the input image; and determining the segmentation lines of the colored squares by using intermediate points of the colored squares, the position of intermediate point of over two adjacent colored squares is determined according to the formula below:

$$X_m \approx \frac{\int_{X_l}^{X_r} g(x) x \, dx}{\int_{X_l}^{X_r} g(x) \, dx}$$

where, $d = g(x) = \max(\|\vec{P} - \vec{L}\|, \|\vec{P} - \vec{R}\|)$, $\vec{P}$, $\vec{L}$ and $\vec{R}$ are RGB color vectors, $X_l$ denotes a position of a pixel point in a first colored square, $X_m$ denotes the position of the intermediate point, and $X_r$ denotes a position of a pixel point in a second colored square.

7. The method according to claim 6, wherein the selecting, using multiple predefined sliding window templates, a sliding window having a minimum distance from each sliding window template from the sliding windows at the multiple positions as a matched sliding window of the sliding window template comprises:

for each sliding window template, calculating a distance between a sliding window at each position and the sliding window template; and designating a sliding window having a minimum distance as a matched sliding window of the sliding window template.

8. The method according to claim 7, wherein before calculating a distance between a sliding window at each position and the sliding window template, the method further comprises:

filtering the sliding windows at the multiple positions using a filter according to the sliding window features of the sliding windows at the multiple positions to calculate a distance between sliding windows at remaining positions and the sliding window template.

9. The method according to claim 7, wherein for each sliding window template, the distance between the sliding window at each position and the sliding window template is calculated according to:

$$D = d_R + d_G + d_b = f(\vec{R}, \vec{R}_T) + f(\vec{G}, \vec{G}_T) + f(\vec{B}, \vec{B}_T);$$

where, $\vec{R}$, $\vec{G}$ and $\vec{B}$ are feature vectors of the R channel, the G channel and the B channel of the sliding window, respectively, $\vec{R}_T$, $\vec{G}_T$ and $\vec{B}_T$ are feature vectors of corresponding R channel, G channel and B channel in the sliding window template, $$d = f(\vec{S}, \vec{T}) = \underset{\Delta s}{\operatorname{argmin}} \left\| \vec{S} - \Delta s, \vec{T} \right\|^2,$$

$\vec{S}$ is a feature vector of the R channel, the G channel, or the B channel of the sliding window, $\vec{T}$ is a feature vector of corresponding R channel, G channel, or B channel in the sliding window template, $\Delta s$ is displacement of $\vec{S}$.

10. The method according to claim 6, wherein the method further comprises:

checking the colored squares segmented by the segmentation lines, and determining that the colored squares segmented by the segmentation lines are colored squares of the color checker if variance of an area color value of each colored square is less than a first threshold value and a difference of color between different colored squares is less than a second threshold value, if not, replace the predefined sliding window, and repeat a process of detection.

11. Electronic equipment, comprising an apparatus for detecting a color checker in an image, the apparatus for detecting a color checker in an image being configured to:

extract sliding window features of sliding windows at multiple positions from an input image using a predefined sliding window;

select, using multiple predefined sliding window templates, a sliding window having a minimum distance from each sliding window template from the sliding windows at the multiple positions as a matched sliding window of the sliding window template; and determine segmentation lines of colored squares of the color checker according to a matching result of each sliding window template, wherein, the apparatus for detecting a color checker in an image is configured to: scan the whole of the input image point by point by using the predefined sliding window, extract a feature at each position passed by the predefined sliding window, and take it as the sliding window feature of a sliding window of the predefined sliding window at the position, the extracted feature is a feature corresponding to a predefined position of the predefined sliding window in the input image; and the sliding window feature of the sliding window of the predefined sliding window at each position includes: a feature vector corresponding to an R channel, a feature vector corresponding to a G channel and a feature vector corresponding to a B channel, the apparatus for detecting a color checker in an image is configured to: determine an intermediate point of each two adjacent colored squares by using positions of pixel points corresponding to the predefined positions of each matched sliding window in the input image; and determine the segmentation lines of the colored squares by using the intermediate points of the colored squares, the apparatus for detecting a color checker in an image is configured to determine the intermediate point of each two adjacent colored squares according to the following formula:

$$X_m \approx \frac{\int_{X_l}^{X_r} g(x)x\,dx}{\int_{X_l}^{X_r} g(x)\,dx}$$

where, $d=g(x)=\max(\|\vec{P}-\vec{L}\|, \|\vec{P}-\vec{R}\|)$, $\vec{P}$, $\vec{L}$ and $\vec{R}$ being RGB color vectors, $X_l$ denotes a position of a pixel point in a first colored square, $X_m$ denotes a position of an intermediate point, and $X_r$ denotes a position of a pixel point in a second colored square.

\* \* \* \* \*